(12) United States Patent
Zhao et al.

(10) Patent No.: US 12,327,691 B1
(45) Date of Patent: Jun. 10, 2025

(54) LOW INDUCTANCE CAPACITOR WITH CONCENTRIC RING CAPACITOR CORE SIMILAR TO WATER RIPPLE DIFFUSION

(71) Applicant: University of Shanghai for Science and Technology, Shanghai (CN)

(72) Inventors: Lihui Zhao, Shanghai (CN); Hui Guo, Shanghai (CN); Dongdong Zhang, Shanghai (CN); Botong Wang, Shanghai (CN); Shuo Weng, Shanghai (CN); Chengduo Li, Shanghai (CN); Jinzhi Feng, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 0 days.

(21) Appl. No.: 19/001,936

(22) Filed: Dec. 26, 2024

(30) Foreign Application Priority Data

Dec. 28, 2023 (CN) .......................... 202311830358.2

(51) Int. Cl.
| | | |
|---|---|---|
| H01G 4/32 | (2006.01) | |
| H01G 4/224 | (2006.01) | |
| H01G 4/236 | (2006.01) | |

(52) U.S. Cl.
CPC .............. *H01G 4/32* (2013.01); *H01G 4/236* (2013.01); *H01G 4/224* (2013.01)

(58) Field of Classification Search
CPC ........ H01G 4/385; H01G 4/224; H01G 4/236; H01G 4/32
See application file for complete search history.

(56) References Cited

U.S. PATENT DOCUMENTS

| | | | | |
|---|---|---|---|---|
| 3,028,447 | A * | 4/1962 | Garn | ................. H01B 11/1834 |
| | | | | 423/489 |
| 4,547,832 | A * | 10/1985 | Lavene | ................. H01G 4/228 |
| | | | | 29/25.42 |
| 2013/0194712 | A1* | 8/2013 | Lavene | ................. H01G 4/28 |
| | | | | 361/274.1 |

FOREIGN PATENT DOCUMENTS

| | | |
|---|---|---|
| CN | 201886903 | 6/2011 |
| CN | 204011074 | 12/2014 |
| CN | 204102715 | 1/2015 |
| CN | 207149410 | 3/2018 |
| CN | 210272087 | 4/2020 |

(Continued)

OTHER PUBLICATIONS

Gai Bin, et al., "Study on Stray Inductance Measurement Method of DC-link Capacitor," Power Capacitor & Reactive Power Compensation, Oct. 2021, pp. 77-82, vol. 42, No. 5 doi: 10.14044/j.1674-1757.pcrpc.2021.05.013 Full text; Claims involved:1-5.

(Continued)

*Primary Examiner* — David M Sinclair
(74) *Attorney, Agent, or Firm* — Piloff Passino & Cosenza LLP; Rachel K. Piloff; Sean A. Passino

(57) ABSTRACT

A low inductance capacitor with a concentric ring capacitor core similar to water ripple diffusion is provided, including a laminated bus bar, a capacitor core, a filler and a shell; where the laminated bus bar is embedded in a center of the capacitor core; and the filler is poured between the capacitor core and the shell. The capacitor features a concentric ring-shaped design. The capacitor core consists of metal electrode layers, insulating inner films, and a central gap hole, with the metal electrode layers arranged in a concentric pattern that decreases in thickness, mimicking the diffusion of water ripples.

2 Claims, 4 Drawing Sheets

(56) References Cited

FOREIGN PATENT DOCUMENTS

| | | |
|---|---|---|
| CN | 113394020 | 9/2021 |
| CN | 216250423 | 4/2022 |
| KR | 101473179 B1 * | 12/2014 |
| WO | 2004056160 | 7/2004 |

OTHER PUBLICATIONS

Retrieval report—First search dated Jul. 26, 2024 in SIPO application No. 202311830358.2.
Retrieval report—Supplementary search dated Aug. 14, 2024 in SIPO application No. 202311830358.2.
Notification to Grant Patent Right for Invention dated Aug. 24, 2024 in SIPO application No. 202311830358.2.
Notice of first Office action dated Jul. 31, 2024 in SIPO application No. 202311830358.2.

* cited by examiner

LOW INDUCTANCE CAPACITOR WITH CONCENTRIC RING CAPACITOR CORE SIMILAR TO WATER RIPPLE DIFFUSION

CROSS-REFERENCE TO RELATED APPLICATIONS

This application claims priority to Chinese Patent Application No. 202311830358.2, filed on Dec. 28, 2023, the contents of which are hereby incorporated by reference.

TECHNICAL FIELD

The present disclosure belongs to the technical field of semiconductors, and in particular relates to a low inductance capacitor with a concentric ring capacitor core similar to water ripple diffusion.

BACKGROUND

Nowadays, new energy vehicles have become the only way for the sustainable development of the automobile industry. The drive motor controller is developing towards high efficiency, and new materials such as silicon carbide (SIC) and gallium nitride (GaN) are emerging. Due to the extremely fast switching speed of the components of the drive motor controller, high stray inductance may cause significant switching loss, voltage overshoot and other problems, so it is necessary to reduce stray inductance. Thin-film capacitor is the main component in the drive circuit of new energy vehicle, mainly used for energy storage, smoothing, and buffering. When operating with current, the thin-film capacitor will produce stray inductance. The stray inductance may cause instability or fluctuations in the voltage across the capacitor, thereby interfering with the normal operation of the circuit. Due to the existence of stray inductance, the response time of capacitor to circuit changes will be prolonged, so the charging and discharging process of capacitor will become slower, thereby affecting the response time of circuit. The interaction between stray inductance and capacitor and other inductance elements will lead to resonance or oscillation. Therefore, in order to adapt to the drive motor controller with higher power density and higher working frequency, it has become an urgent problem to reduce the stray inductance of capacitor.

The capacitor cores currently used in thin-film capacitors are cuboid. At present, the method for reducing stray inductance of capacitor cores is to place multiple capacitor cores in close proximity, and use the topological cancellation principle to achieve low inductance, but the effect is relatively limited. Moreover, this layout, due to the stacking of multiple capacitor cores, may cause temperature concentration and have a certain impact on the performance of capacitors, thus violating the development direction of drive motor controller towards high power density and high efficiency.

SUMMARY

The disclosure aims to propose a low inductance capacitor with a concentric ring capacitor core similar to water ripple diffusion to solve the shortcomings of the prior art, and to realize low stray inductance and uniform temperature distribution of the thin-film capacitor on the basis of small volume and large capacitance.

To achieve the above objectives, the present disclosure provides the following solution.

A low inductance capacitor with a concentric ring capacitor core similar to water ripple diffusion, including a laminated bus bar, a capacitor core, a filler and a shell;

the laminated bus bar is embedded in a center of the capacitor core; and the filler is poured between the capacitor core and the shell.

Optionally, the laminated bus bar includes an upper bus bar and a lower bus bar;

the upper bus bar is provided with an upper bus bar connection terminal; and the lower bus bar is provided with a lower bus bar connection terminal.

Optionally, the capacitor core includes metal electrode layers, insulating inner envelopes and a central clearance circular hole;

a width of the lower bus bar is equal to a diameter of the central clearance circular hole, and the lower bus bar is embedded in the central clearance circular hole, and current flow directions on the laminated bus bar and the capacitor core are opposite;

the metal electrode layers include a first metal electrode layer, a second metal electrode layer and a third metal electrode layer;

the insulating inner envelopes include a first insulating inner envelope, a second insulating inner envelope, a third insulating inner envelope and a fourth insulating inner envelope, and thicknesses of the insulating inner envelopes are all equal; and the insulating inner envelopes and the metal electrode layers are sequentially embedded with each other.

Optionally, the metal electrode layers are sequentially arranged in a concentric ring like water wave diffusion, a thickness of the first metal electrode layer is the largest, and thicknesses of the second metal electrode layer and the third metal electrode layer decrease sequentially according to a water wave diffusion function:

$$D = A \cdot \sin(k \cdot x - \varpi \cdot t + \varphi) \cdot e^{\frac{-(x^2+y^2)}{2\sigma^2}}$$

where D represents a thickness of a metal electrode layer, A represents an amplitude, k represents a wave number, w represents an angular frequency, t represents time, q represents an initial phase, (x, y) represents a center position of a wave, and σ represents a constant for controlling wave attenuation.

Optionally, the laminated bus bar is made of metal copper; the metal electrode layers are made of polypropylene films by winding;

the insulating inner envelopes are made of polyurethane; the filler is made of epoxy resin by casting; and the shell is made of polyphenylene sulfide.

Compared with the prior art, the disclosure has the following beneficial effects.

The present disclosure achieves the effect of reducing stray inductance by changing the conventional rectangular capacitor core and adopting a concentric ring capacitor core similar to water ripple diffusion.

The present disclosure may further reduce stray inductance by adjusting the position of the bus bar, so that the current loop directions of the lower bus bar and the capacitor core are opposite and the lower bus bar is located at the right center position of the capacitor core.

The disclosure may greatly reduce the problems of poor contact such as virtual welding and desoldering, and has good heat dissipation effect, uniform internal temperature distribution, more compact structure and effective volume reduction.

BRIEF DESCRIPTION OF THE DRAWINGS

In order to explain the technical solution of the present disclosure more clearly, the drawings needed in the embodiments will be briefly introduced below. Apparently, the drawings in the following description are only some embodiments of the present disclosure. For one of ordinary skill in the art, other drawings may be obtained according to these drawings without paying creative labor.

DETAILED DESCRIPTION OF THE EMBODIMENTS

In the following, the technical solutions in the embodiments of the present disclosure will be clearly and completely described with reference to the attached drawings. Apparently, the described embodiments are only a part of the embodiments of the present disclosure, but not all the embodiments. Based on the embodiments in the present disclosure, all other embodiments obtained by one of ordinary skill in the art without creative effort belong to the protection scope of the present disclosure.

In order to make the above objects, features and advantages of the present disclosure more obvious and easier to understand, the present disclosure will be further described in detail with the attached drawings and specific embodiments.

Figure 1:
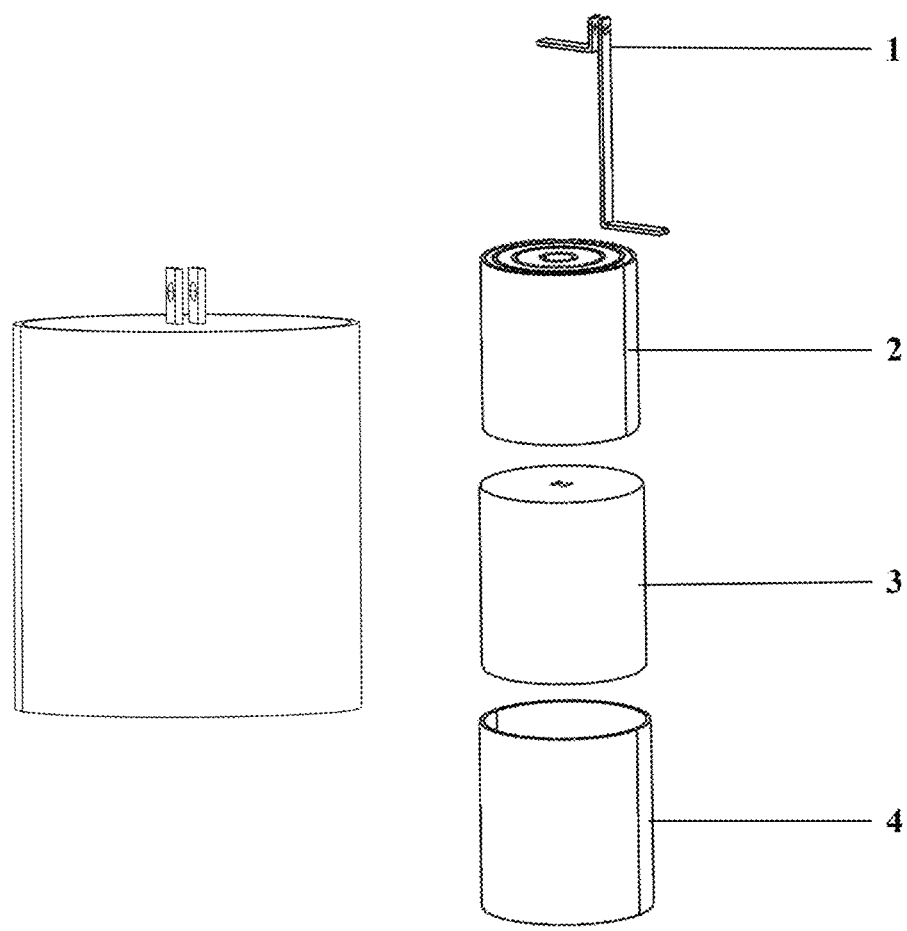
FIG. 1 is a schematic diagram of an overall structure according to an embodiment of the present disclosure.

In this embodiment, as shown in FIG. 1, a low inductance capacitor with a concentric ring capacitor core 2 similar to water ripple diffusion includes a laminated bus bar 1, a capacitor core 2, a filler 3 and a shell 4.

The laminated bus bar 1 is embedded in the center of the capacitor core 2, and the laminated bus bar 1 is made of metal copper.

The filler 3 is poured between the capacitor core 2 and the shell 4, and the filler is made of epoxy resin and the shell 4 is made of polyphenylene sulfide.

Figure 2:
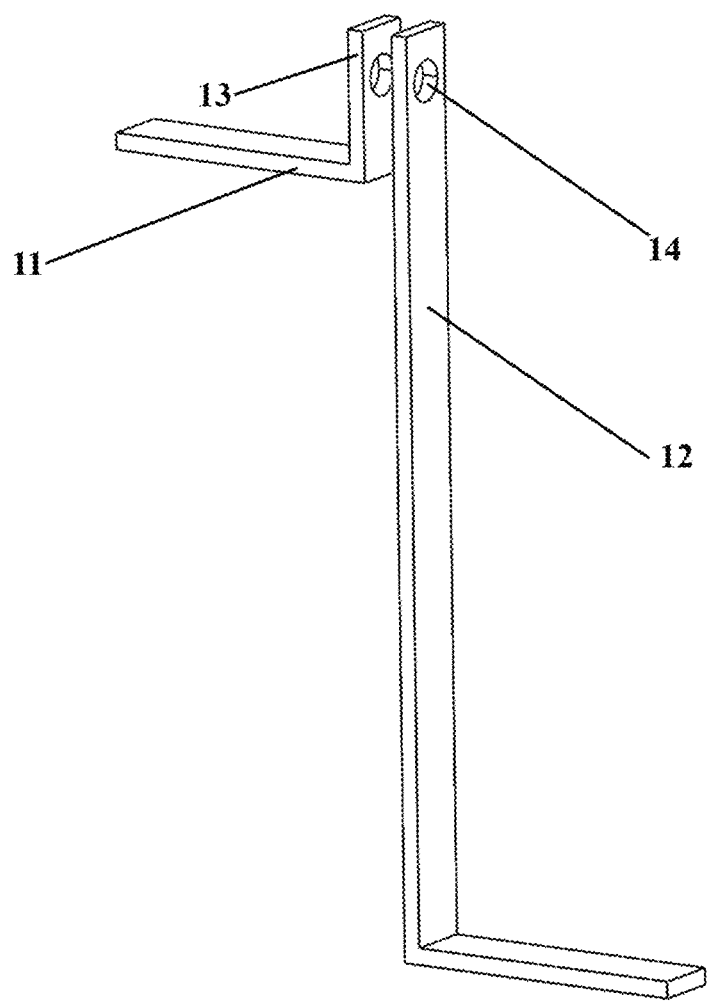
FIG. 2 is a schematic diagram of a laminated bus bar structure according to an embodiment of the present disclosure.

As shown in FIG. 2, the laminated bus bar 1 includes an upper bus bar 11 and a lower bus bar 12; the upper bus bar 11 is provided with an upper bus bar connection terminal 13; and the lower bus bar 12 is provided with a lower bus bar connection terminal 14.

The capacitor core 2 includes metal electrode layers, insulating inner envelopes and a central clearance circular hole 28. The metal electrode layers are made of polypropylene films, and the insulating inner envelopes are made of polyurethane.

The width of the lower bus bar 12 is equal to the diameter of the central clearance circular hole 28, and the lower bus bar 12 is embedded in the central clearance circular hole 28, and the current flow directions on the laminated bus bar 1 and the capacitor core 2 are opposite.

The metal electrode layers include a first metal electrode layer 21, a second metal electrode layer 22 and a third metal electrode layer 23. The metal electrode layers are sequentially arranged in a concentric ring like water wave diffusion, the thickness of the first metal electrode layer 21 is the largest, and thicknesses of the second metal electrode layer 22 and the third metal electrode layer 23 decrease sequentially according to the water wave diffusion function:

$$D = A \cdot \sin(k \cdot x - \varpi \cdot t + \varphi) \cdot e^{\frac{-(x^2+y^2)}{2\sigma^2}}$$

where D represents the height of water surface fluctuation, and the height of water surface fluctuation in this embodiment is the thickness of a metal electrode layer; A represents amplitude and is the height of the wave; k represents the wave number, which is related to the wavelength; $\overline{\omega}$ represents the angular frequency, which is related to the period of the wave; t represents time; φ represents the initial phase; k·x−ω·t+φ represents the phase of the wave; (x, y) represents the center position of the wave; and σ represents a constant for controlling wave attenuation.

The first metal electrode layer 21 with the largest thickness will generate the strongest and densest magnetic field among the three positive currents, with the highest stray inductance. The second metal electrode layer 22 in the middle ring will generate a strong and dense magnetic field and a high stray inductance. The third metal electrode layer 23 has the smallest magnetic field and stray inductance, and has the smallest influence on the outside world. The stray inductance of the line where the first metal electrode layer 21 is located is:

$$L_{total}=L_{self}-M_{mutual}$$

where $L_{total}$ is the stray inductance of the electrode layer, $L_{self}$ is self inductance and $M_{mutual}$ is mutual inductance. For the first metal electrode layer 21, the mutual inductance is mainly the mutual inductance generated thereon by the second metal electrode layer 22, the third metal electrode layer 23 and the lower bus bar 12.

Similarly, according to the topological cancellation principle, the total inductance of the second metal electrode layer 22 and the third metal electrode layer 23 will be further reduced. Moreover, because the third metal electrode layer 23 with the smallest thickness and the smallest generated inductance is in the outermost ring, the influence on other components inside the motor controller is reduced. The inductance of the metal electrode layers and the inductance that affects the outside world are considered comprehensively.

Finally, because the lower bus bar 12 is located at the center of the central clearance circular hole 28 of the capacitor core 2, and the flow directions of the lower bus bar 12 and the three currents in the capacitor core 2 are opposite, the mutual inductance may be further reduced, thereby reducing the total stray inductance.

The insulating inner envelopes include a first insulating inner envelope 24, a second insulating inner envelope 25, a third insulating inner envelope 26 and a fourth insulating inner envelope 27. The insulating inner envelopes all have equal thicknesses of 1 millimeter (mm), where the first insulating inner envelope contains the central clearance circular hole 28.

Figure 3:
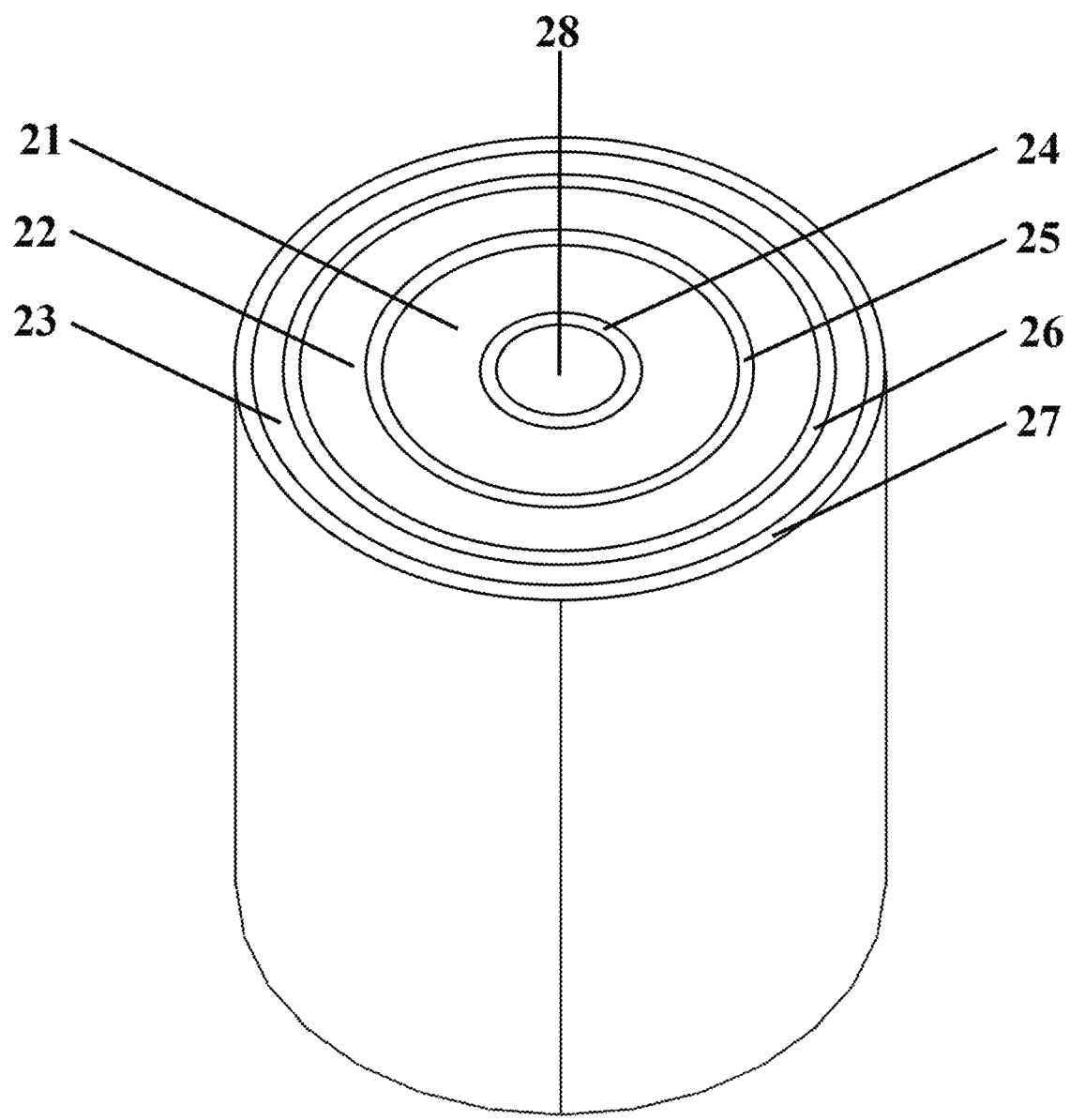
FIG. 3 is a schematic structural diagram of a capacitor core according to an embodiment of the present disclosure.
Figure 4:
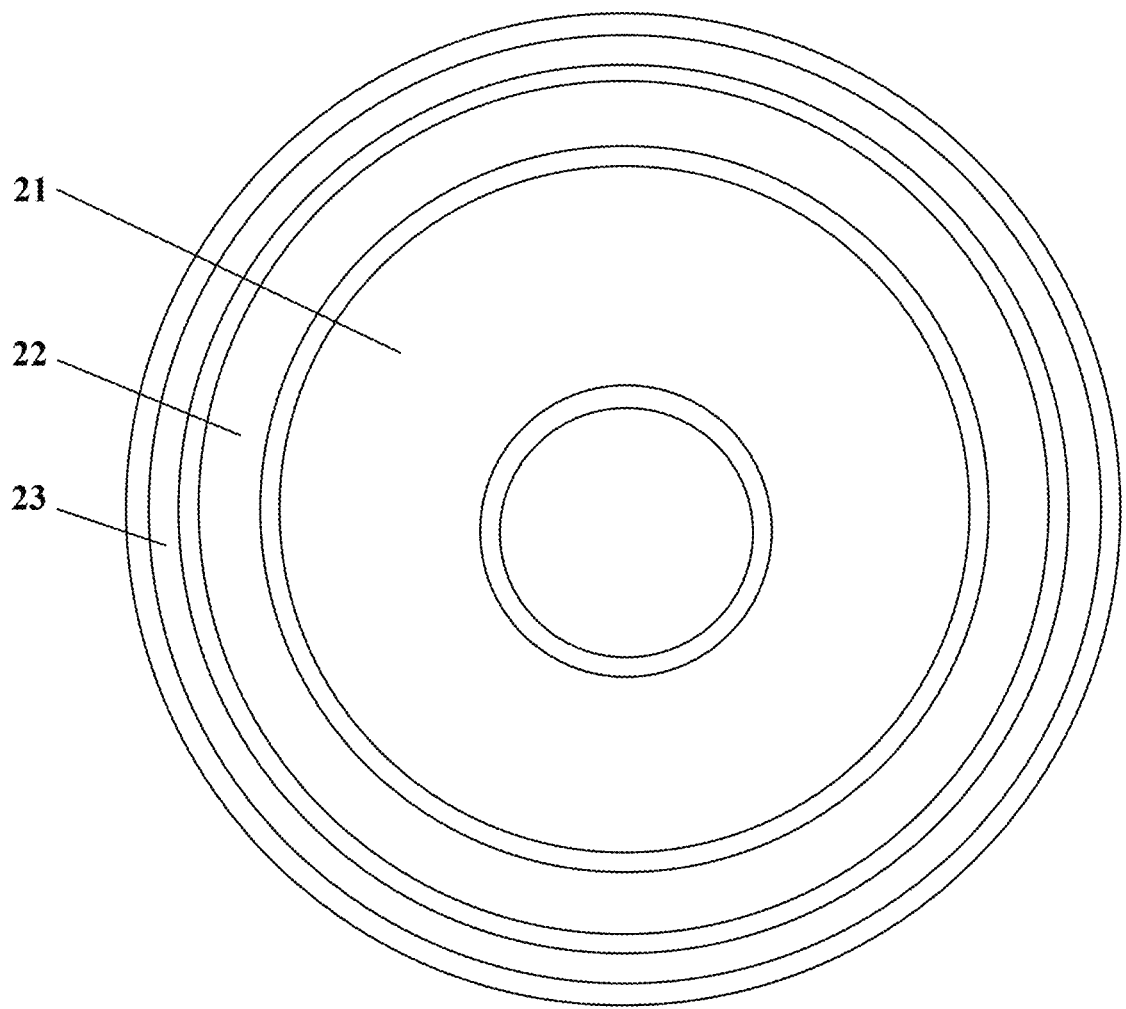
FIG. 4 is a schematic diagram of a capacitor core interface according to an embodiment of the present disclosure.

As shown in FIG. 3 and FIG. 4, the insulating inner envelopes and the metal electrode layers are sequentially embedded with each other.

In this embodiment, ANSYS Q3D software may be used to extract stray inductance from the model. At the frequency of 1 megahertz (MHz), the inductance of the original square capacitor with the same capacity is 6.494 nanohenry (nH). ANSYS FLUENT software may be used to simulate the electric thermal coupling of the model. The ripple current rating of the original DC bus capacitor is 180 ampere (A), the convective heat transfer coefficient is 5 watt per square meter degree Celsius (W/m²° C.), and the highest temperature of the capacitor is 64.030° C. when the ambient temperature is 25° C., and the highest temperature is concentrated in the capacitor core.

Under the same conditions, the inductance value of the low inductance capacitor with the concentric ring capacitor core similar to the water ripple diffusion of this embodiment is 4.571 nH, the highest temperature is 59.582° C., and the temperature distribution is uniform. The stray inductance of the capacitor core is greatly reduced and the high temperature resistance of the capacitor core is improved, which is beneficial to improve the performance of the capacitor and prolong the service life of the capacitor. The disclosure provides some reference value for the structural design of capacitor core and capacitor and reduction of stray inductance of capacitor.

The above-mentioned embodiments only describe the preferred mode of the present disclosure, and do not limit the scope of the present disclosure. Under the premise of not departing from the design spirit of the present disclosure, various modifications and improvements made by ordinary technicians in the field to the technical solution of the present disclosure should fall within the protection scope of the present disclosure.

What is claimed is:

1. A low inductance capacitor comprising: a laminated bus bar, a capacitor core, a filler and a shell;
   the laminated bus bar is embedded in a center of the capacitor core;
   the filler is poured between the capacitor core and the shell;
   the laminated bus bar comprises an upper bus bar and a lower bus bar;
   the upper bus bar is provided with an upper bus bar connection terminal;
   the lower bus bar is provided with a lower bus bar connection terminal;
   the capacitor core comprises metal electrode layers, insulating inner envelopes and a central clearance circular hole;
   a width of the lower bus bar is equal to a diameter of the central clearance circular hole, and the lower bus bar is embedded in the central clearance circular hole, and current flow directions on the laminated bus bar and the capacitor core are opposite;
   the metal electrode layers comprise a first metal electrode layer, a second metal electrode layer and a third metal electrode layer;
   the insulating inner envelopes comprise a first insulating inner envelope, a second insulating inner envelope, a third insulating inner envelope and a fourth insulating inner envelope, and thicknesses of the insulating inner envelopes are all equal;
   the insulating inner envelopes and the metal electrode layers are sequentially embedded with each other; and
   the metal electrode layers are sequentially arranged in a concentric ring, a thickness of the first metal electrode layer is largest, and thicknesses of the second metal electrode layer and the third metal electrode layer decrease sequentially according to a water wave diffusion function:

$$D = A \cdot \sin(k \cdot x - \varpi \cdot t + \varphi) \cdot e^{\frac{-(x^2+y^2)}{2\sigma^2}}$$

wherein D represents a thickness of the metal electrode layers, A represents an amplitude, k represents a wave number, $\overline{\omega}$ represents an angular frequency, t represents time, φ represents an initial phase, (x, y) represents a center position of a wave, and σ represents a constant for controlling wave attenuation.

2. The low inductance capacitor according to claim 1, wherein the laminated bus bar is made of metal copper; the metal electrode layers are made of polypropylene films by winding;
   the insulating inner envelopes are made of polyurethane;
   the filler is made of epoxy resin by casting; and
   the shell is made of polyphenylene sulfide.

* * * * *